(No Model.)
T. FELPS.
COTTON SCRAPER ATTACHMENT.
No. 336,803.        Patented Feb. 23, 1886.
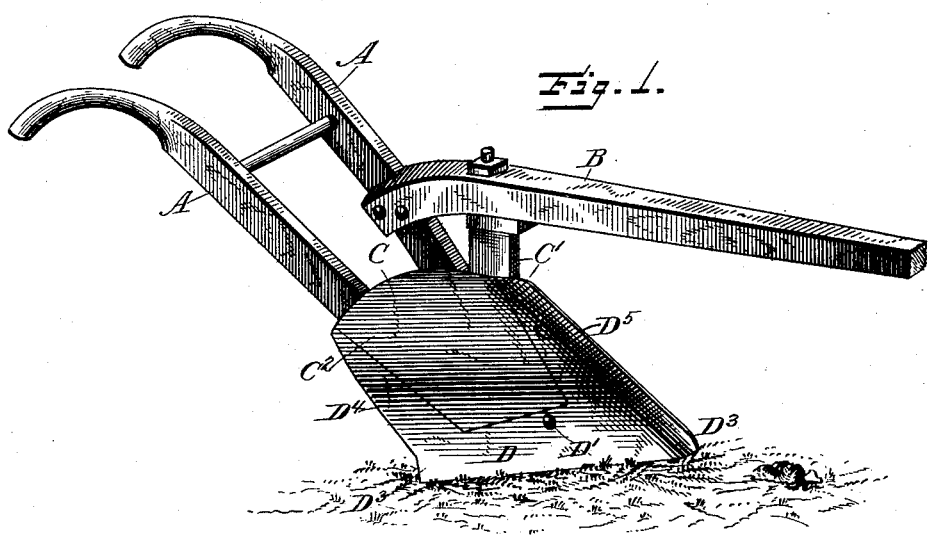
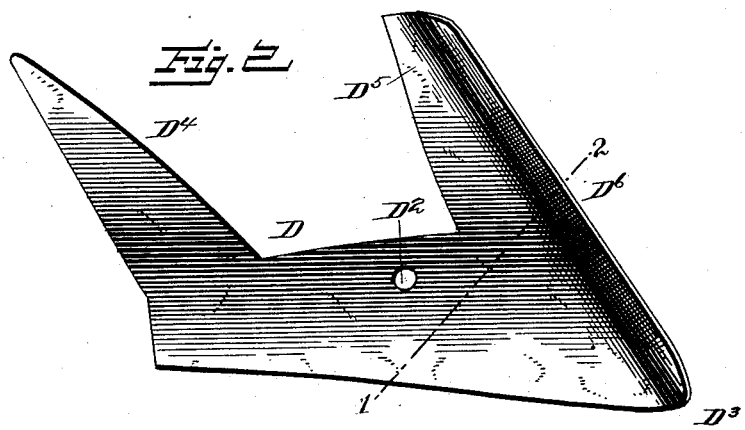
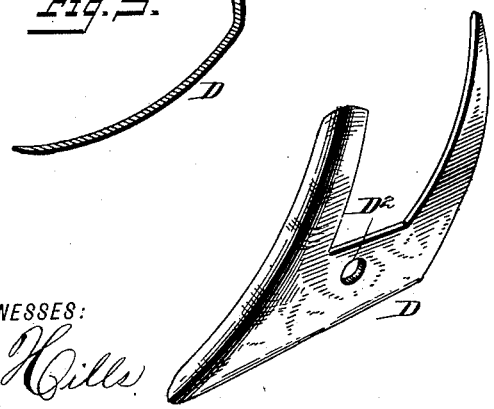
WITNESSES:
INVENTOR
Thomas Felps
BY
E. B. Stoelting
ATTORNEY

UNITED STATES PATENT OFFICE.

THOMAS FELPS, OF NEAR KENT'S STORE, LOUISIANA.

COTTON-SCRAPER ATTACHMENT.

SPECIFICATION forming part of Letters Patent No. 336,803, dated February 23, 1886.

Application filed November 23, 1885. Serial No. 183,680. (No model.)

*To all whom it may concern:*

Be it known that I, THOMAS FELPS, a citizen of the United States, residing near Kent's Store, in the parish of East Feliciana and State of Louisiana, have invented certain new and useful Improvements in Cotton-Scraper Attachments for Plows, of which the following is a specification, reference being had to the accompanying drawings.

This invention relates to cotton-scraper attachments for plows, and is an improvement upon Patent No. 270,654, granted me January 16, 1883.

Referring to the drawings, Figure 1 is a perspective of a plow provided with my improved scraper. Fig. 2 is a detail in side elevation of my scraper detached. Fig. 3 is a section of the same on the line 1 2, and Fig. 4 is a perspective thereof, taken principally from the rear.

Like letters indicate like parts in all the figures.

As in my previous patent, A represents the handles; B, the beam, and C the plow proper, which consists of the standard C' and mold-board $C^2$.

Fitted snugly to the plow C, and held in position by means of a bolt, D', is my improved scraper attachment D, said bolt passing through an aperture, $D^2$, formed in said scraper, and into an aperture in the plow proper, usually provided for the ordinary plow-point.

The scraper may consist of either cast or wrought steel, as desired.

One objection to the scraper illustrated and described in my previous patent is, that it runs too deep, thus rendering the manipulation of the plow more arduous, while at the same time it is not only necessary but highly essential that it should be constructed so that it might be run as shallow as desired. This objection I overcome by slightly raising and curving the point $D^3$.

Another material objection to my previous construction is, that by not extending the rear corner or edge of the scraper sufficiently high furrows turned by the mold-board and the adjacent portion of the scraper are incompletely laid, so that grass, weeds, and other vegetation are left uncovered, and therefore in a condition to continue growing. Now, by extending the rear portion, $D^4$, of the scraper to the top and rear corner of the plowshare, I lay the furrows and completely invert and cover the weeds and sod therein, so that said rows of growing vegetation are not left between the rows of cotton. Again, still another objection is, that a certain portion of the soil and weeds is carried up toward the standard on the landside, where it is conveyed over into the row of cotton, where said weeds are left to grow. This objection is overcome by forming on the front end of my scraper the upward extension or land-lap $D^5$, which extends up even with the top of the mold-board and close to the plow-standard, which causes the soil to be thrown onto the mold-board and cast off.

By reference to Fig. 3, which is a cross-section on lines 1 2 of Fig. 2, it will be noticed that the scraper in cross section is continuously curved, and that all abrupt angles, as in my previous plow, are avoided, by which means I secure an easy turning of the soil, and, as has been practically demonstrated, a scraper that performs its work in a perfectly satisfactory manner.

The entire scraper is concavo-convex, its convexed side being disposed at the land side of the plow, which conformation of the scraper is clearly illustrated in Fig. 4. The front, $D^6$, of the scraper is also rounded transversely, so that at all points such a configuration is presented to the soil which is to be removed from the row as tends to reduce the resistance to the advancement of the plow to a minimum, and at the same time to completely cover the weeds and other vegetation removed by the scraper.

Having described my improvement and advantages, what I claim is—

The combination, with a plow, of the scraper D, secured, as at D', to the mold-board, and having the upwardly-projecting wing $D^4$ and lap $D^5$, each extending to the top of the share, and the elevated turned point $D^3$, and bent and curved front edge, $D^6$, the whole being recessed to fit the plowshare of an ordinary plow, substantially as shown and described.

In testimony whereof I affix my signature in presence of two witnesses.

THOMAS FELPS.

Witnesses:
W. H. CARROLL,
H. T. VICK.